United States Patent
Jin et al.

(10) Patent No.: US 8,634,780 B2
(45) Date of Patent: Jan. 21, 2014

(54) TERMINAL, METHOD, AND WIRELESS COMMUNICATION FOR POWER SAVING

(75) Inventors: Sung Geun Jin, Daejeon (KR); Hyoung Jin Kwon, Chungcheongbuk-do (KR); Kap Seok Chang, Daejeon (KR); Yong Sun Kim, Chungcheongnam-do (KR); Seung Eun Hong, Daejeon (KR); Woo Yong Lee, Daejeon (KR); Hyun Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 244 days.

(21) Appl. No.: 13/004,449

(22) Filed: Jan. 11, 2011

(65) Prior Publication Data

US 2011/0171990 A1 Jul. 14, 2011

(30) Foreign Application Priority Data

Jan. 12, 2010 (KR) ........................ 10-2010-0002482
Feb. 5, 2010 (KR) ........................ 10-2010-0011211
Dec. 21, 2010 (KR) ........................ 10-2010-0131493

(51) Int. Cl.
*H04B 1/00* (2006.01)
*H04K 3/00* (2006.01)

(52) U.S. Cl.
USPC .............................. 455/69; 455/522; 370/311

(58) Field of Classification Search
USPC ...................................... 455/69, 522; 370/311
See application file for complete search history.

(56) References Cited

U.S. PATENT DOCUMENTS

| | | | |
|---|---|---|---|
| 2005/0122927 A1* | 6/2005 | Wentink | 370/311 |
| 2007/0066273 A1 | 3/2007 | Laroia et al. | |
| 2009/0196212 A1* | 8/2009 | Wentink | 370/311 |

FOREIGN PATENT DOCUMENTS

| | | |
|---|---|---|
| JP | 2004-320153 A | 11/2004 |
| KR | 2007-0079274 A | 8/2007 |

* cited by examiner

*Primary Examiner* — Lee Nguyen

(74) *Attorney, Agent, or Firm* — Rabin & Berdo, P.C.

(57) ABSTRACT

Provided are a terminal for power saving, a power saving method of the terminal, and a wireless communication system for power saving. A receiving terminal may receive scheduling information associated with data transmission and reception of a transmitting terminal. The receiving terminal may directly communicate with the transmitting terminal by referring to the scheduling information.

14 Claims, 5 Drawing Sheets

TERMINAL, METHOD, AND WIRELESS COMMUNICATION FOR POWER SAVING

CROSS-REFERENCE TO RELATED APPLICATIONS

This application claims the benefit of Korean Patent Application No. 10-2010-0002482, filed on Jan. 12, 2010, Korean Patent Application No. 10-2010-0011211, filed on Feb. 5, 2010, and Korean Patent Application No. 10-2010-0131493, filed on Dec. 21, 2010, in the Korean Intellectual Property Office, the disclosures of which are incorporated herein by reference.

BACKGROUND

1. Field of the Invention

The present invention relates to a terminal, method, and wireless communication system for power saving, and more particularly, a terminal for power saving that may save a power of a terminal enabling a wireless communication, a power saving method of the terminal, and a wireless communication system for power saving of the terminal.

2. Description of the Related Art

In a wireless communication system, terminals may directly communicate with each other without using a base station or an access point (AP). However, when the terminals directly communicate with each other, the terminals may be unaware of when a counter party terminal transmits data. Accordingly, in order to receive data, the terminals may need to wait in a wake-up state until the counter party terminal transmits the data. That is, in a direct communication mode, the terminals may not operate in a power saving manner.

SUMMARY

An aspect of the present invention provides a terminal, method, and wireless communication system for power saving that may perform direct communication by applying a power saving scheme and thereby reduce a power consumption when terminals directly communicate with each other.

According to an aspect of the present invention, there is a terminal for power saving, including: a communication unit to receive scheduling information for data transmission and reception of at least one external terminal; and a control unit to control the communication unit to directly communicate with the at least one external terminal by referring to the received scheduling information.

The scheduling information may include information associated with a transmission to interval for transmitting data, and the control unit may operate in a sleep mode in an interval excluding the transmission interval.

The control unit may operate in a receive mode in the transmission interval and may control the communication unit to receive the data from the at least one external terminal.

The communication unit may perform an initialization for a direct communication with the at least one external terminal by transmitting a request message for requesting the direct communication to a control apparatus controlling an operation of the at least one external terminal, and by receiving, from the control apparatus, a response message indicating that the at least one external terminal accepts the direct communication.

The scheduling information may be provided from the at least one external terminal.

The scheduling information may be provided from a base station or an access point.

The scheduling information may be provided from the control apparatus after authentication and association establishment with a control apparatus controlling an operation of the at least one external terminal is completed.

According to another aspect of the present invention, there is provided a power saving method of a terminal, the method including: receiving scheduling information for data transmission and reception of at least one external terminal; and directly communicating with the at least one external terminal by referring to the received scheduling information.

According to still another aspect of the present invention, there is provided a wireless communication system for power saving of a terminal, including: a first terminal to transmit data based on scheduling information for data transmission and reception; and a second terminal to share the scheduling information of the first terminal, and to receive the data through a direct communication with the first terminal by referring to the scheduling information.

The wireless communication system may further include a control apparatus to provide scheduling information of the first terminal to the first terminal and the second terminal.

According to embodiments of the present invention, when at least two terminals directly communicate with each other, the at least two terminals may operate by referring to scheduling information used for transmitting data, and thereby may reduce a power consumption.

According to embodiments of the present invention, a terminal may be aware in advance of information associated with a time when another terminal transmits data and thus, the terminal may operate in a sleep mode in a time interval where the other terminal does not transmit data and thereby may reduce a power consumption.

According to embodiments of the present invention, a control apparatus such as a base station may generate scheduling information associated with data transmission and reception.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
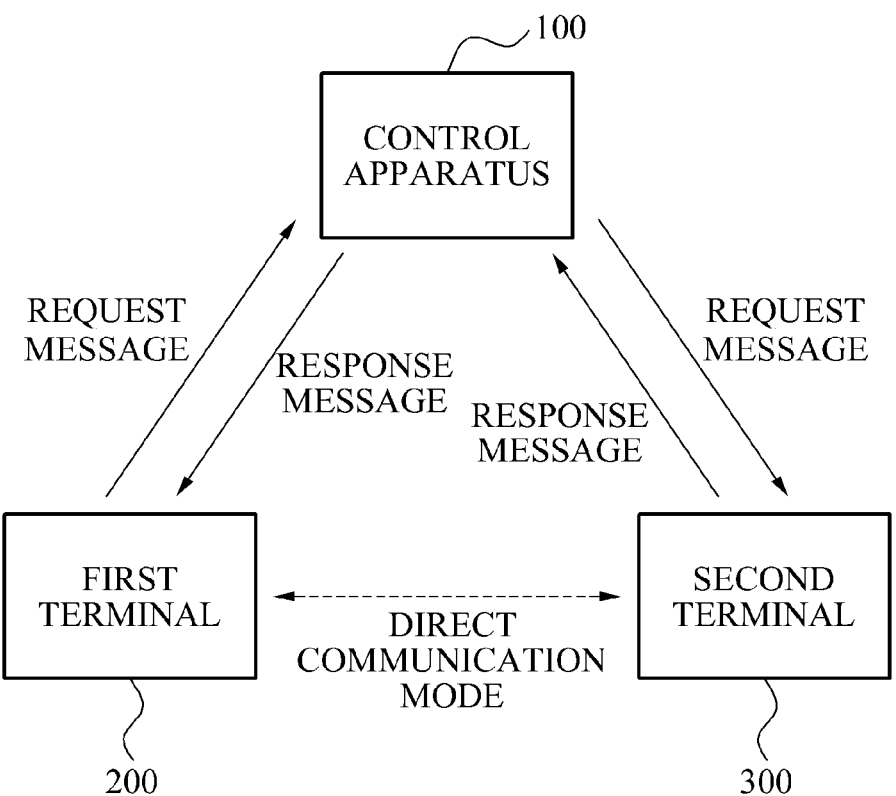
FIG. 1 is a diagram illustrating a wireless communication system for power saving of a terminal according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

When it is determined detailed description related to a related known function or configuration they may make the purpose of the present invention unnecessarily ambiguous in describing the present invention, the detailed description will be omitted here. Also, terms used herein are defined to appropriately describe the exemplary embodiments of the present invention and thus may be changed depending on a user, the intent of an operator, or a custom. Accordingly, the terms must be defined based on the following overall description of this specification.

FIG. 1 is a diagram illustrating a wireless communication system for power saving of a terminal according to an embodiment of the present invention.

Referring to FIG. 1, the wireless communication system may include a control apparatus 100, a first terminal 200, and a second terminal 300. Even though two terminals, for example, the first terminal 200 and the second terminal 300 are illustrated in FIG. 1, a number of terminals is not limited thereto.

The control apparatus 100 corresponds to an apparatus for controlling an operation of the first terminal 200 and the second terminal 300, and may be, for example, a base station or an access point (AP).

The first terminal 200 and the second terminal 300 correspond to apparatuses for transmitting and receiving of data by means of a wireless communication. Accordingly, the first terminal 200 and the second terminal 300 may directly communicate with each other without using the control apparatus 100. The direct communication corresponds to a communication where the first terminal 200 and the second terminal 300 directly transmit and receive data without an intervention of the control apparatus 100.

Hereinafter, an initialization process for the direct communication will be described.

For the direct communication, the first terminal 200 may transmit, to the control apparatus 100, a request message for requesting the direct communication with the second terminal 300. When the first terminal 200 performs the direct communication, the request message may include capability information notifying whether a support for power saving is available.

The control apparatus 100 may transmit, to the second terminal 300, the request message received from the first terminal 200. Based on the capability information included in the received request message, the control apparatus 100 may generate a new request message requesting the direct communication. The request messages may include details of the first terminal 200 requesting the direct communication with the second terminal 200. The control apparatus 100 may transmit one of the request messages to the second terminal 300.

The second terminal 300 may transmit, to the control apparatus 100, a response message with respect to the request message received from the control apparatus 100. The control apparatus 100 may transmit, to the first terminal 200, the response message received from the second terminal 300. The response message corresponds to a message responding to the request for the direct communication, and may include capability information indicating whether the direct communication is available.

When the capability information indicating whether the second terminal 300 may perform the direct communication is included in the response message, the initialization process for the direct communication may be completed. Accordingly, the first terminal 200 and the second terminal 300 may operate in a direct communication mode where the first terminal 200 and the second terminal 300 may perform the direct communication, and may operate in a sleep mode or in a transmit mode based on scheduling information.

As described above with reference to FIG. 1, while performing the direct communication, the first terminal 200 and the second terminal 300 participating into the direct communication during the initialization process may exchange capability information indicating whether support for the power saving is available. When the first terminal 200 and the second terminal 300 are verified to support the power saving through exchange of the capability information, the first terminal 200 and the second terminal 300 may apply a power saving scheme according to an embodiment of the present invention while performing the direct communication.

Figure 2:
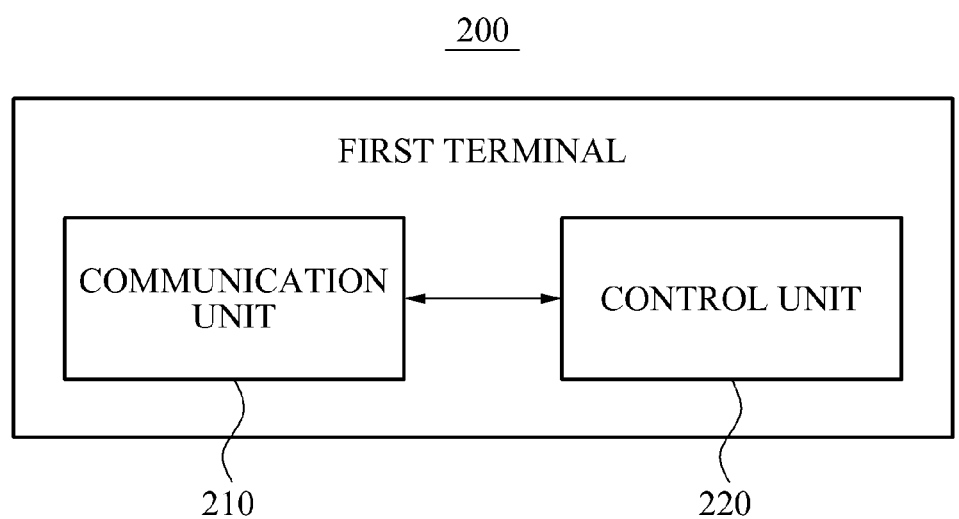
FIG. 2 is a block diagram illustrating a first terminal of FIG. 1.

FIG. 2 is a block diagram illustrating the first terminal 200 of FIG. 2.

Referring to FIG. 2, the first terminal 200 may include a communication unit 210 and a control unit 220.

The communication unit 210 may transmit a request message for requesting a direct communication with at least one external terminal to the control apparatus 100 controlling an operation of the at least one external terminal. Also, the communication unit 210 may receive, from the control apparatus 100, a response message indicating that the at least one external terminal accepts the direct communication. Through this, an initialization for the direct communication may be completed.

The communication unit 210 may receive scheduling information for transmission and reception of data with the at least one external terminal through a wireless communication. Hereinafter, descriptions will be made using the second terminal 300 as the at least one external terminal. The communication unit 210 may receive scheduling information of the second terminal 300 via the control apparatus 100, or may directly receive the scheduling information from the second terminal 300.

The control unit 220 may control the communication unit 210 to communicate with the second terminal 300 by referring to the received scheduling information.

Scheduling information of the second terminal 300 may include information associated with a transmission interval where the second terminal 300 transmits data. That is, the scheduling information may include a transmission point in time of the data and a point in time when the transmission is terminated. In the transmission interval, the control unit 220 may operate in a receive mode for receiving data from the second terminal 300. In an interval excluding the transmission interval, that is, in a sleep interval by verifying the scheduling information of the second terminal 300, the control unit 220 may operate in a sleep mode. Accordingly, in the transmission interval, the control unit 220 may control the communication unit 210 to receive the data from the second terminal 300. Scheduling information of the second terminal 300 may further include information associated with the sleep interval where the data is not transmitted.

The control unit 220 may control the communication unit 210 to provide, to the second terminal 300, scheduling information for data transmission and reception of the first terminal 200.

As described above, for power saving, the first terminal 200 and the second terminal 300 may share in advance mutual scheduling information while operating in a direct communication mode. For example, the first terminal 200 and the second terminal 300 may mutually notify information regarding a transmission point in time when each of the first terminal 200 and the second terminal 300 transmits data. At a point in time when the second terminal 300 transmits data, the first terminal 200 may be woken up to receive the data. Also, in a time interval when the second terminal 300 does not transmit data, the second terminal 300 may enter a sleep mode to minimize a power consumption.

Scheduling information of the second terminal 300 may be directly transmitted from the second terminal 300 to the first terminal 200. Scheduling information of the second terminal 300 may be transmitted to the first terminal 200 via the control apparatus 100. The control apparatus 100 may generate scheduling information of the first terminal 200 or the second terminal 300, and may transmit the generated scheduling information to the first terminal 200 and the second terminal 300.

Through the above process, the first terminal 200 and the second terminal 300 may share mutual scheduling information. Scheduling information of each of the first terminal 200 and the second terminal 300 participating in the direct communication may be the same.

Figure 3:
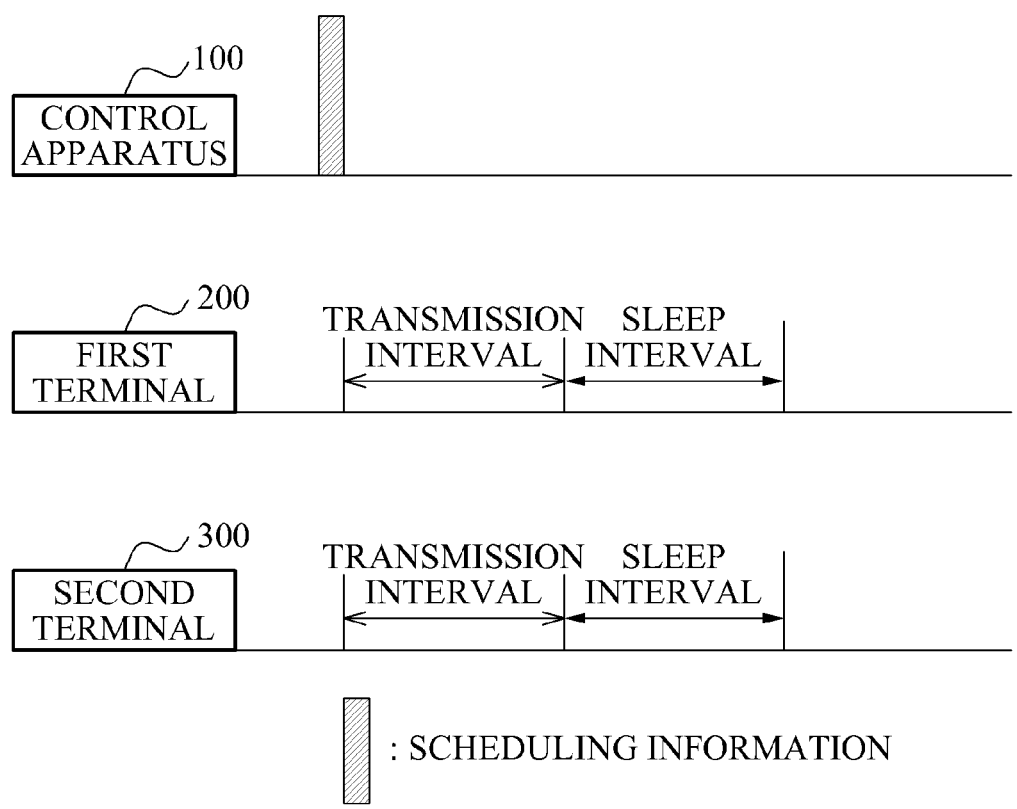
FIG. 3 is a diagram to describe an example of a power saving scheme according to an embodiment of the present invention.

FIG. 3 is a diagram to describe an example of a power saving scheme according to an embodiment of the present invention.

The control apparatus 100 may generate scheduling information of each of the first terminal 200 and the second terminal 300, and may transmit the scheduling information to each of the first terminal 200 and the second terminal 300. The scheduling information may include transmission time information of data or transmission interval information.

Accordingly, each of the first terminal 200 and the second terminal 300 may be aware of when a counter party terminal performing the direct communication, that is, the second terminal 300 and the first terminal 200 transmits data to a corresponding counter party terminal. For example, the first terminal 200 may be ware of a time when the second terminal 300 transmits data to the first terminal 200, by referring to scheduling information of the second terminal 300.

Accordingly, in a time interval where the second terminal 300 transmits data, the first terminal 200 may be woken up to directly receive the data from the second terminal 300. In an interval excluding the transmission interval for the direct communication, the first terminal 200 may operate in a sleep mode. In FIG. 3, during a time period indicated by the sleep mode, the first terminal 200 and the second terminal 300 may not perform the direct communication and thus, operate in the sleep mode, saving the power consumption.

Figure 4:
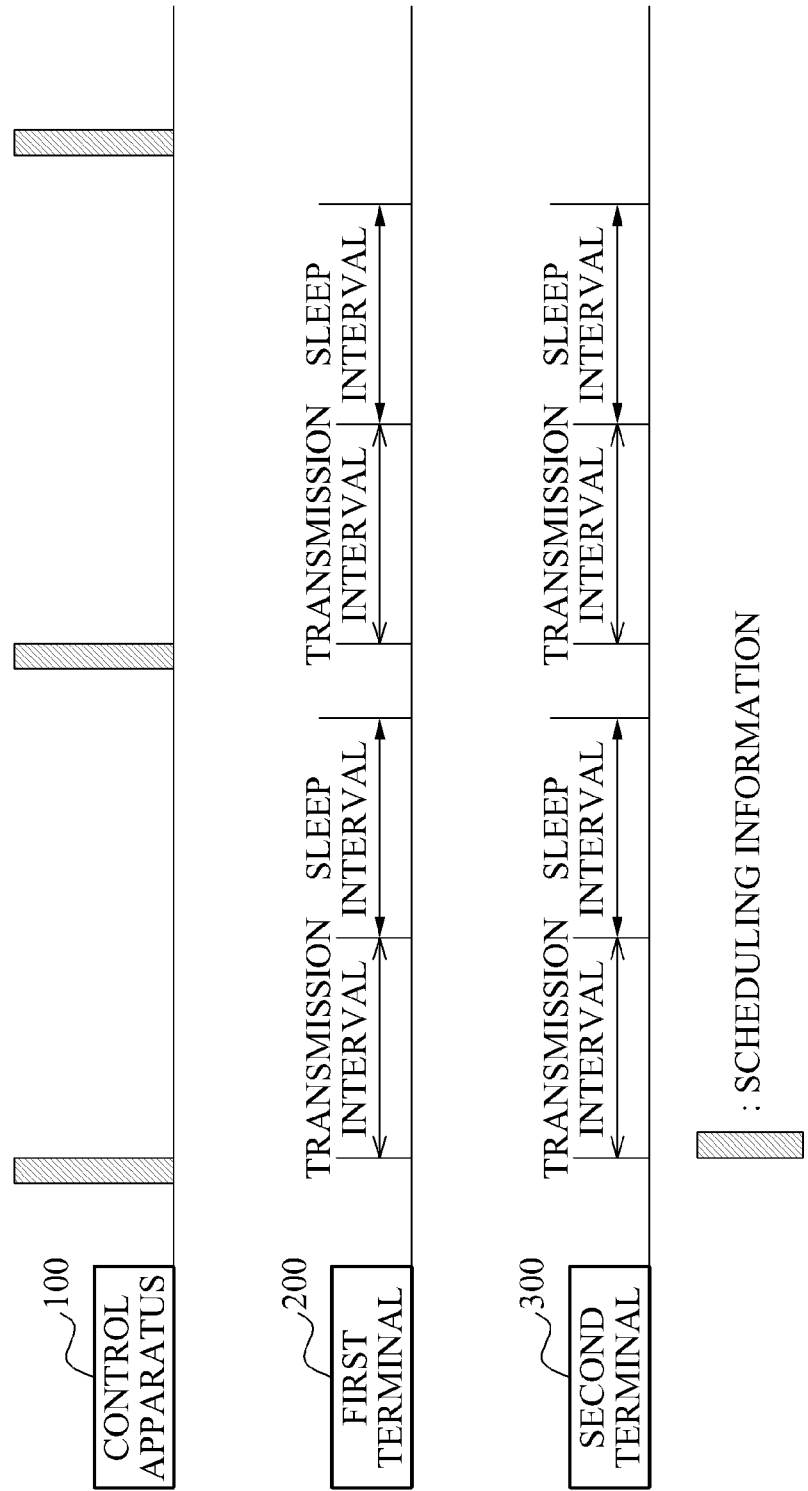
FIG. 4 is a diagram to describe an example of additionally allocating a transmission interval for a direct communication to a first terminal and a second terminal according to an embodiment of the present invention.

FIG. 4 is a diagram to describe an example of additionally allocating a transmission interval for a direct communication to the first terminal 200 and the second terminal 300 according to an embodiment of the present invention.

When a direct communication mode is maintained, the control apparatus 100 may continuously transmit scheduling information to the first terminal 200 and the second terminal 300. The first terminal 200 and the second terminal 300 may be additionally allocated with time information of an available transmission interval from the control apparatus 100.

Referring to FIG. 1 through FIG. 4, the control apparatus 100 may schedule a data transmission time with respect to the first terminal 200 or the second terminal 300. The first terminal 200 and the second terminal 300 may access a radio channel in a scheduled interval to transmit and receive the data.

The first terminal 200 and the second terminal 300 may employ a scheme of accessing a radio channel through a contention, and transmitting data. When employing the above scheme, a time interval for the radio communication may be classified into a time interval for accessing the radio channel through the contention and a time interval for accessing the radio channel based on scheduling instead of the contention.

When the direct communication scheme is applied, the control apparatus 100 may notify the first terminal 200 and the second terminal 300 about scheduling information of each of the first terminal 200 and the second terminal 300, and information associated with the time interval where the radio channel access through the contention is available. Accordingly, the first terminal 200 and the second terminal 300 may access the radio channel through the contention, and may directly participate into the direct communication. In this example, the first terminal 200 and the second terminal 300 may operate in a wake-up state at all times, and may wait for data transmission from an external terminal.

In addition to the method described above with reference to FIG. 1, the initialization process for the direct communication may be performed through a connection establishment between the control apparatus 100 and a terminal. For example, in an Institute of Electrical and Electronics Engineers (IEEE) 802.x standard, each of the first terminal 200 and the second terminal 300, and the control apparatus 100 may perform a connection establishment through an authentication and association process. When the connection establishment is performed, the first terminal 200 and the second terminal 300 may receive, from the control apparatus 100, control information associated with a point in time when data transmission and reception is available, and may participate into transmission and reception of data. When the first terminal 200 and the second terminal 300 operates in a direct communication mode, the first terminal 200 and the second terminal 300 may operate in a sleep mode using information received from the control apparatus 100.

Figure 5:
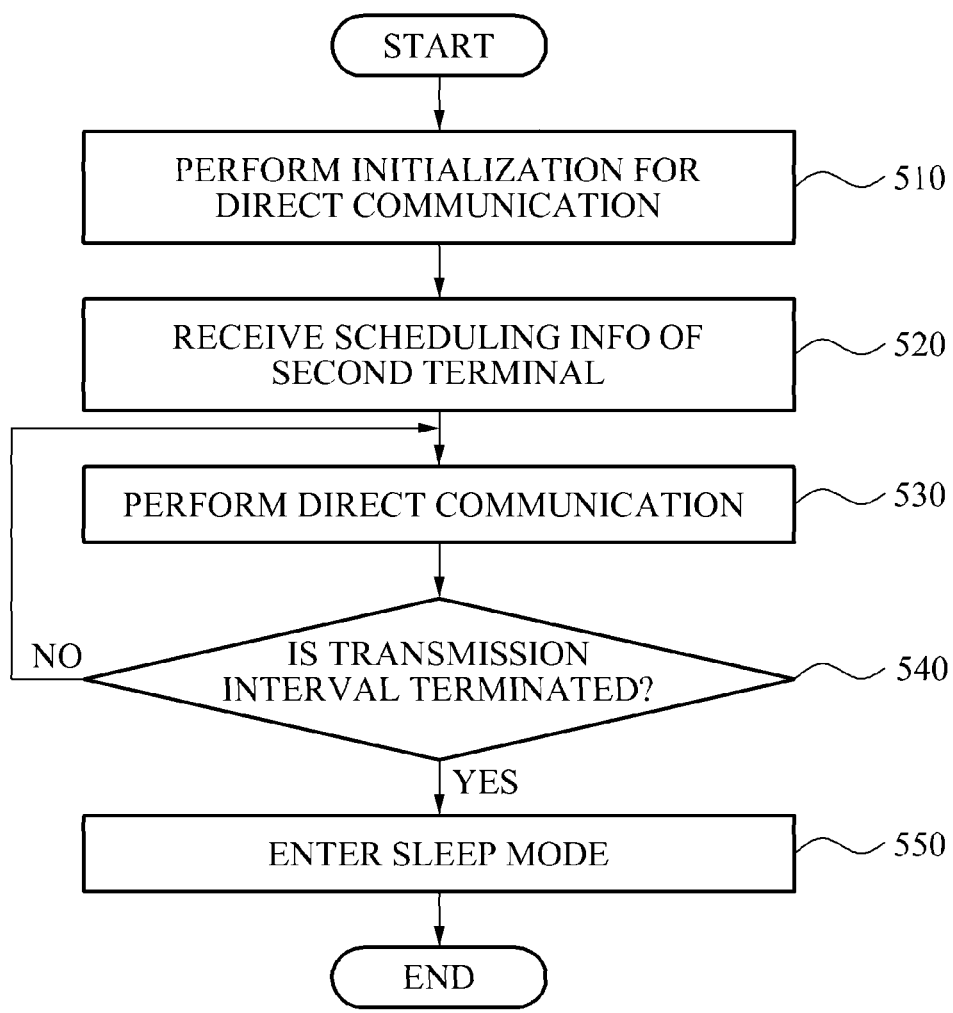
FIG. 5 is a flowchart illustrating a power saving method of a terminal according to an to embodiment of the present invention.

FIG. 5 is a flowchart illustrating a power saving method of a terminal according to an embodiment of the present invention.

The power saving method of the terminal shown in FIG. 5 may be performed by the wireless communication system described above with reference to FIG. 1 through FIG. 4.

In operation 510, a first terminal and a second terminal may perform an initialization process required for a direct communication. The initialization process may include a process of transmitting, by the first terminal to the second terminal via a control apparatus, a request message requesting the direct communication, and receiving, from the second terminal, a response message with respect to the direct communication request.

In operation 520, the first terminal may receive scheduling information for data transmission and reception of the second terminal. Scheduling information of the second terminal may be received from the control apparatus or the second terminal.

In operation 530, the first terminal may perform the direct communication with the second terminal by referring to the received scheduling information of the second terminal. For example, in a transmission interval included in the scheduling information, the first terminal may operate in a receive mode for receiving the data from the second terminal. While operating in the receive mode, the first terminal may directly receive data from the to second terminal.

When the transmission interval is terminated in operation 540, the first terminal may operate in a sleep mode in an interval excluding the transmission interval included in the scheduling information in operation 550.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A terminal for power saving, comprising:
a communication unit to receive scheduling information for data transmission and reception of at least one external terminal; and
a control unit to control the communication unit to perform direct communication with the at least one external terminal by referring to the received scheduling information;
wherein the scheduling information is provided by a control apparatus external to both the terminal and the at least one external terminal; and
wherein the control apparatus facilitates the direct communication at least in part by, in response to a request message from the communication unit, generating a new request message including information about the communication unit and sending the new request message to the at least one external terminal.

2. The terminal of claim 1, wherein:
the scheduling information comprises information associated with a transmission interval for transmitting data, and
the control unit operates in a sleep mode in an interval excluding the transmission interval.

3. The terminal of claim 2, wherein the control unit operates in a receive mode in the transmission interval and controls the communication unit to receive the data from the at least one external terminal.

4. The terminal of claim 1, wherein the communication unit performs an initialization for the direct communication with the at least one external terminal by transmitting the request message for requesting the direct communication to the control apparatus, and by receiving, from the control apparatus, a response message indicating that the at least one external terminal accepts the direct communication.

5. The terminal of claim 1, wherein the scheduling information is provided from the at least one external terminal.

6. The terminal of claim 1, wherein the scheduling information is provided from a base station or an access point.

7. The terminal of claim 1, wherein the scheduling information is provided from the control apparatus after authentication and association establishment.

8. The terminal of claim 1, wherein the control apparatus generates the new request message based at least in part on capability information included in the request message from the communication unit.

9. A power saving method of a terminal, the method comprising:
receiving, from an external control apparatus, a request message generated by the external apparatus in response to a request message from at least one external terminal for direct communication with the terminal;
further receiving, from the external control apparatus, scheduling information for data transmission and reception of the at least one external terminal; and
directly communicating with the at least one external terminal by referring to the received scheduling information.

10. The method of claim 9, wherein:
the scheduling information comprises information associated with a transmission interval for transmitting data, and
the communicating comprises operating in a sleep mode in an interval excluding the transmission interval to receive the data from the at least one external terminal.

11. A wireless communication system for power saving of a terminal, comprising:
a first terminal to transmit data based on scheduling information for data transmission and reception;
a second terminal to share the scheduling information of the first terminal, and to receive the data through a direct communication with the first terminal by referring to the scheduling information; and
a control apparatus external to both the first terminal and the second terminal, to facilitate direct communication between the first terminal and the second terminal at least partly by, in response to a request for the direct communication from the first terminal, generating a new request and sending the new request to the second terminal, and to provide the scheduling information of the first terminal to the second terminal.

12. The wireless communication system of claim 11, wherein the control apparatus is configured to transmit a request from the first terminal for direct communication with the second terminal, the request including capability information notifying whether a support for power saving is available.

13. The wireless communication system of claim 12, wherein:
scheduling information of the first terminal comprises information associated with a transmission interval for transmitting the data,
the second terminal operates in a sleep mode in an interval excluding the transmission interval, and operates in a receive mode in the transmission interval to receive the data from the first terminal.

14. The wireless communication system of claim 11, wherein:
scheduling information of the first terminal comprises information associated with a transmission interval for transmitting the data,
the second terminal operates in a sleep mode in an interval excluding the transmission interval, and operates in a receive mode in the transmission interval to receive the data from the first terminal.

* * * * *